US012665116B2

(12) United States Patent
Shaffer

(10) Patent No.: US 12,665,116 B2
(45) Date of Patent: Jun. 23, 2026

(54) SOLID-STATE DEGAUSS CIRCUIT FOR USE IN AN ELECTROMAGNETIC LOCK

(71) Applicant: Hanchett Entry Systems, Inc., Phoenix, AZ (US)

(72) Inventor: Randall Shaffer, Phoenix, AZ (US)

(73) Assignee: Hanchett Entry Systems, Inc., Phoenix, AZ (US)

( * ) Notice: Subject to any disclaimer, the term of this patent is extended or adjusted under 35 U.S.C. 154(b) by 208 days.

(21) Appl. No.: 18/736,904

(22) Filed: Jun. 7, 2024

(65) Prior Publication Data

US 2025/0378981 A1 Dec. 11, 2025

(51) Int. Cl.

| | |
|---|---|
| ***H01F 13/00*** | (2006.01) |
| ***E05B 47/00*** | (2006.01) |
| ***E05C 19/16*** | (2006.01) |
| ***G07C 9/00*** | (2020.01) |
| ***H01F 7/06*** | (2006.01) |

(52) U.S. Cl.

CPC ....... *H01F 13/006* (2013.01); *E05B 47/0002* (2013.01); *E05C 19/166* (2013.01); *G07C 9/00174* (2013.01); *H01F 7/064* (2013.01)

(58) Field of Classification Search

CPC ... H01F 13/006; H01F 7/064; G07C 9/00174; E05C 19/166; E05B 47/0002

See application file for complete search history.

(56) References Cited

U.S. PATENT DOCUMENTS

| | | | | |
|---|---|---|---|---|
| 6,611,414 | B1 * | 8/2003 | Lavelle | H01H 47/325 361/154 |
| 8,094,017 | B2 * | 1/2012 | Hunt | E05C 19/166 340/552 |
| 10,573,450 | B2 * | 2/2020 | Davis | H01F 13/006 |
| 10,815,695 | B2 * | 10/2020 | Shaffer | H01F 7/064 |

* cited by examiner

*Primary Examiner* — Fred Guillermety

(74) *Attorney, Agent, or Firm* — Woods Oviatt Gilman LLP; Dennis B. Danella, Esq.

(57) ABSTRACT

A novel and useful solid-state degauss circuit for use with electromagnetic door locks. The door lock circuit is configured to provide a current to the electromagnetic coil load. A pulse width modulation (PWM) controller varies the frequency and/or duty cycle to a switch in series with the coil. An active, solid-state degauss circuit in line with the current flowing through the coil is provided. When triggered either in an uncontrolled or controlled manner, the active degauss circuit composed of a solid-state device, creates a short circuit across the coil after current reversal is achieved thereby degaussing.

19 Claims, 6 Drawing Sheets

SOLID-STATE DEGAUSS CIRCUIT FOR USE IN AN ELECTROMAGNETIC LOCK

TECHNICAL FIELD

The subject matter disclosed herein relates to an electromagnetic lock; and more particularly relates to a solid-state degauss circuit for use in an electromagnetic door lock.

BACKGROUND OF THE INVENTION

Electromagnetic locks, also referred to as maglocks, are well known locking devices that consist of an electromagnet and an armature plate. Typically, the electromagnet portion of the lock is attached to the door frame and a mating armature plate is attached to the door. The two components are positioned so that they are in contact with one another when the door is closed. When the electromagnet is energized, a current passing through the electromagnet creates a magnetic field that causes the armature plate to attract to the electromagnet, creating a magnetic holding force. Because the mating area of the electromagnet and armature is relatively large, the force created by the magnetic flux is strong enough to keep the door locked when an unauthorized attempt is being made to open the door.

An electromagnetic lock operates under the premise of running an electric current though a series of coils that surround a solid or laminate core of some ferrous material. This operation produces the magnetic field that permeates the core, and when the armature plate is placed in contact with the electromagnet, the magnetic holding force is created.

When the current through the coil is removed, the magnetic field collapses, but the core material maintains some amount of residual magnetism that continues to attract the armature plate. In the lock industry, this residual magnetism is not desired. Building code requirements often stipulate that the armature plate must be able to be separated from the electromagnet with a minimal amount of force in a minimal amount of time. Currently, this is achieved by rapidly neutralizing the magnetic field through the use of a passive degauss circuit. The process of degaussing through the use of a passive degaussing circuit operates to remove or neutralize the magnetic field of the electromagnet. Neutralizing a magnetic field often infers generating an opposing magnetic field, and this is accomplished by reversing the direction of the current flowing through the coil windings. However, the use of a passive degaussing circuit has drawbacks. In particular, a passive degaussing circuit takes longer to achieve current reversal and does not maintain a sufficient reverse current for long enough to consistently enable release of some armature plates. Therefore, while using an existing passive degaussing circuit is intended to reduce the residual magnetism in electromagnet 20, these existing solutions may not operate to reduce the residual magnetism to allow door 12 to be opened quickly enough.

Accordingly, there is a need for a degauss circuit that is capable of removing or neutralizing the magnetic field of an electromagnetic lock such that the armature plate can be separated from the electromagnet within the required time using the desired amount of force. This invention meets these needs as well as other needs.

SUMMARY OF THE INVENTION

In order to address these and other needs, the present invention provides a system for degaussing an electromagnet of an electronically actuated door lock. The system for degaussing an electromagnet includes a controller configured to control a current flow through an electromagnetic coil of the electromagnet and a solid-state degaussing circuit. The solid-state degaussing circuit provides at least one resistor in direct electrical connection with a first lead of the electromagnetic coil of the electromagnet, at least one first capacitor electrically connected in line with the at least one resistor and in electrical connection with a ground, a diode in direct electrical connection with the first lead of the electromagnetic coil of the electromagnet, and a transistor electrically connected in line with the diode and in electrical connection with the ground. The transistor electrically connected in line with the diode is connected electrically parallel with the at least one resistor in line with the at least one capacitor. The transistor is configured to switch on to form a short circuit from the first lead of the electromagnetic coil to the ground thereby degaussing the electromagnet.

In another aspect, a method of degaussing an electromagnet of an electronically actuated door lock is provided. The method includes providing a controller configured to control a current flow through an electromagnetic coil of the electromagnet, providing at least one resistor in line with at least one first capacitor in electrical connection between a first lead of the electromagnetic coil and a ground, providing a diode in line with a transistor in electrical connection with the first lead of the electromagnetic coil and the ground and electrically parallel with the at least one resistor in line with the at least one capacitor, reversing the current flow through the electromagnetic coil, and while reversing the current flow through the electromagnetic coil, performing a degaussing operation on the electromagnet. The performing of the degaussing operation comprises switching on the transistor in electrical connection with the first lead of the electromagnetic coil to form a short circuit from the first lead of the electromagnetic coil to the ground.

In a further aspect, a method of degaussing an electromagnetic coil is provided. The method further includes providing at least one resistor in line with at least one capacitor in electrical connection with a first lead of the electromagnetic coil and a ground, providing a diode in line with a transistor in electrical connection with the first lead of the electromagnetic coil and the ground and electrically parallel with the at least one resistor in line with the at least one capacitor, and performing a degaussing operation on the electromagnetic coil by switching on the transistor to form a short circuit from the first lead of the electromagnetic coil to the ground.

Additional objects, advantages and novel features of the present invention will be set forth in part in the description which follows, and will in part become apparent to those in the practice of the invention, when considered with the attached figures.

BRIEF DESCRIPTION OF THE DRAWINGS

The above-mentioned and other features and advantages of this invention, and the manner of attaining them, will become apparent and be better understood by reference to the following description of the invention in conjunctions with the accompanying drawings, wherein.

DETAILED DESCRIPTION

Figure 1:
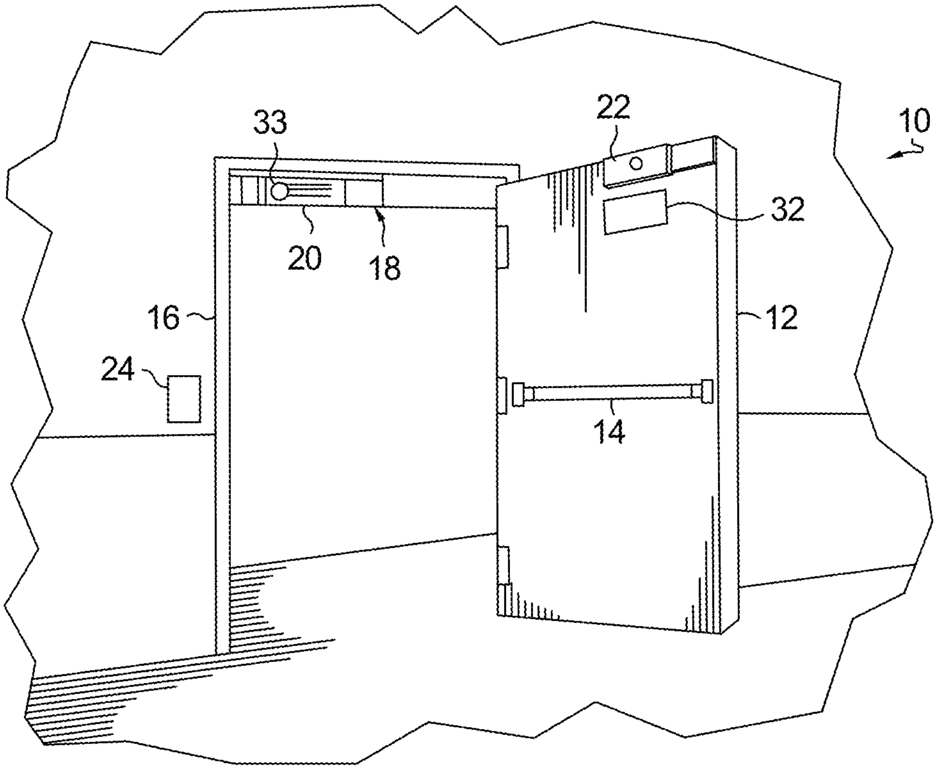
FIG. 1 is a diagram illustrating an example electromagnetic door lock installation incorporating the solid-state degaussing circuit in accordance with aspects of the present invention.

In the following detailed description, numerous specific details are set forth in order to provide a thorough understanding of the invention. It will be understood by those skilled in the art, however, that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Figure 2:
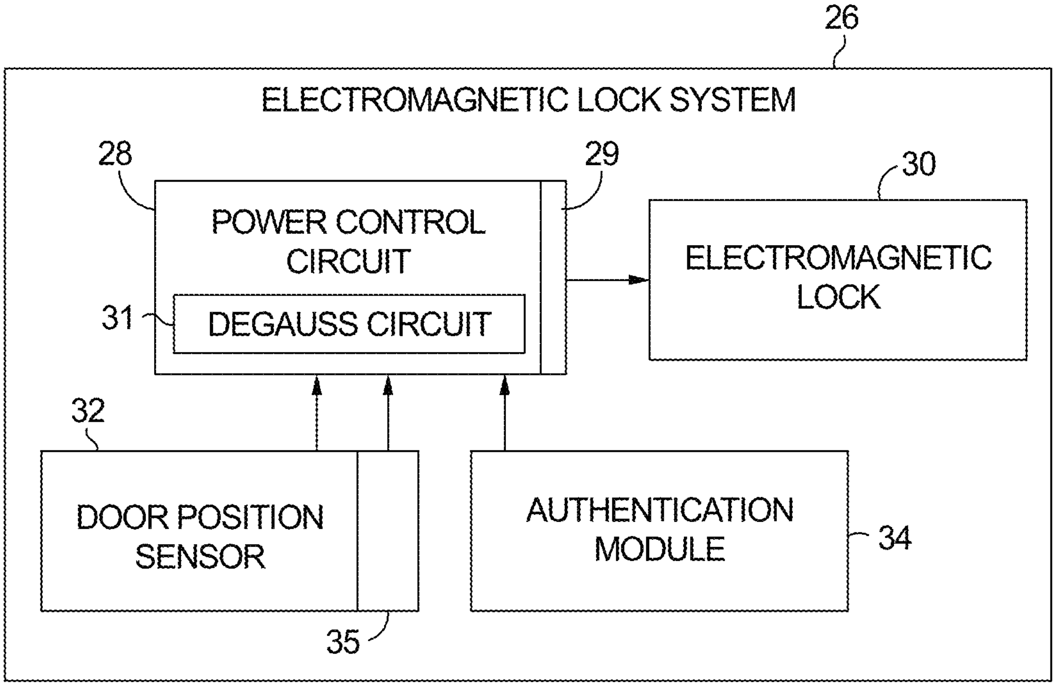
FIG. 2 is a block diagram illustrating an example electromagnetic lock system incorporating the solid-state degaussing circuit in accordance with aspects of the present invention.

FIG. 1 is a diagram illustrating an exemplary electromagnetic door lock installation incorporating the degaussing circuit in accordance with aspects of the present invention. FIG. 2 is a block diagram illustrating an example electromagnetic lock system incorporating the solid-state degaussing circuit in accordance with aspects of the present invention. Referring to FIGS. 1 and 2, an electromagnetic door locking system 10 is shown as being associated with a door 12 and a door frame 16. The electromagnetic door locking system 10 comprises an electromagnet lock 18 including an electromagnet 20 and an armature 22. In this exemplary embodiment, armature 22 may be mounted to door 12, and is positioned so that it may be placed in contact with electromagnet 20 when door 12 is disposed in door frame 16 so that armature 22 can be electromagnetically coupled to electromagnet 20. In a secured setting, an authentication device 24, e.g., a keypad, a swipe card reader, a key fob reader or a biometric sensor, may be provided whereby electromagnet 20 is de-energized upon input of proper access credentials at authentication device 24, thereby releasing armature 22 from electromagnet 20.

Door 12 may optionally be equipped with a mechanical door release mechanism 14, such as a push bar, that operates a latch (not shown), where the latch engages a corresponding recess in door frame 16 to secure door 12 within door frame 16. Alternatively, a doorknob or door lever could also be used to operate the latch. To open door 12 using door release mechanism 14, door release mechanism 14 may be pushed (or turned in the case of a door knob) causing the latch to be released from the recess in door frame 16, and thereby allow opening of door 12 outwardly if electromagnet 20 is de-energized as described above.

Electromagnetic door locking system 10 may further comprise a power control circuit 28 and a door position sensor 32 installed on the door side or alternatively a door position sensor 33 installed on the door frame side, and an authentication module 34 associated with authentication device 24. In some embodiments, power control circuit 28 may include a controller 29 (e.g., a processor, a microprocessor, a field programmable gate array (FPGA), or the like) and a solid-state degauss circuit 31.

In some embodiments, door position sensor 32, 33 may incorporate any suitable sensor system capable of sensing when door 12 is closed and when door 12 is not closed. Example sensor types may include a photo sensor, a pressure sensor, a micro switch, a passive infrared sensor, a radio frequency (RF) sensor or a reed switch, or the like. A "closed door" position is a position of door 12 in which door 12 is engaged with door frame 16 or when armature 22 is engaged with electromagnet 20. Therefore, door position sensor 32, 33 may also be a magnetic bond sensor that monitors when armature 22 is seated against electromagnet 20. Further, door position sensor 32, 33, may also comprise a magnetic bond sensor that senses a change in the magnetic field as armature 22 separates from electromagnet 20.

In certain embodiments, one or more secondary door position sensors 35 may be included to operate as redundant door position sensors should door position sensor 32, 33 fail to perform as intended. For example, circuitry may be provided so that, if secondary back-up sensor 35 senses that door 12 is closed while the primary door position sensor 32, 33 does not, an alert signal may be sent back to power control circuit 28, and an alarm signal may be triggered to notify of a malfunctioning primary door position sensor 32, 33. A similar alarm signal may be triggered if primary door position sensor 32, 33 senses a door closed status and the secondary back-up door position sensor 35 does not.

Electromagnetic lock 18 may be electrically coupled to power control circuit 28 and may be configured to receive electric power from a power supply via power control circuit 28 so as to selectively energize electromagnet 20 and secure door 12 within door frame 16 via the electromagnetic attraction between electromagnet 20 and armature 22. In some exemplary embodiments, power control circuit 28 may operate to cut off electrical power from the power supply to electromagnet 20 when a door open operation or signal is provided through normal operation of system 10, or by providing an authorized code using authentication device 24. In another exemplary embodiment, when door position sensor 32, 33 senses that the door is not closed, power control circuit 28 may operate to cut off or reduce electrical power to electromagnet 20.

Figure 3:
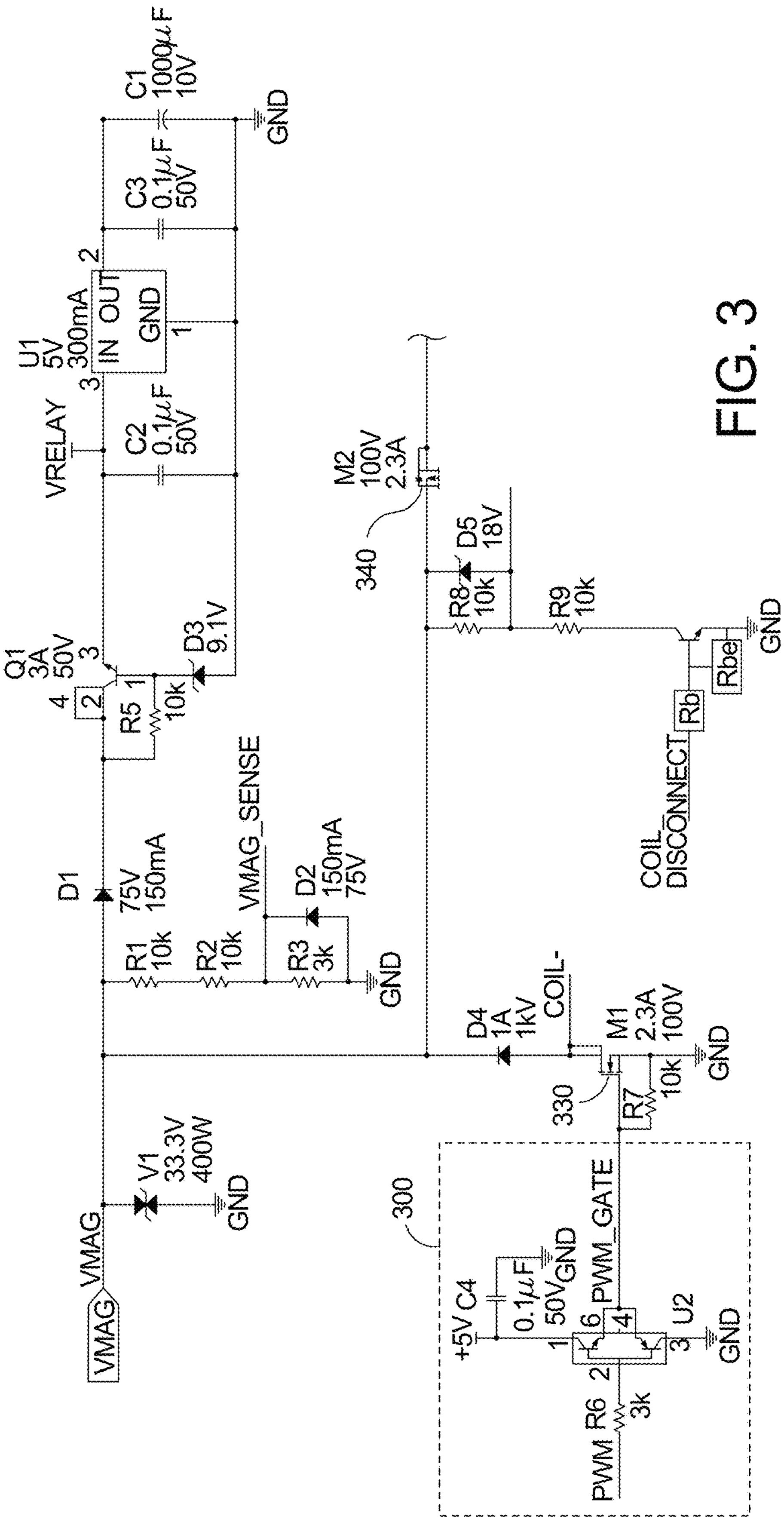
FIG. 3 is a schematic diagram illustrating relevant portions of a power control circuit of an electronically actuated door lock system in accordance with aspects of the present invention.
Figure 3:
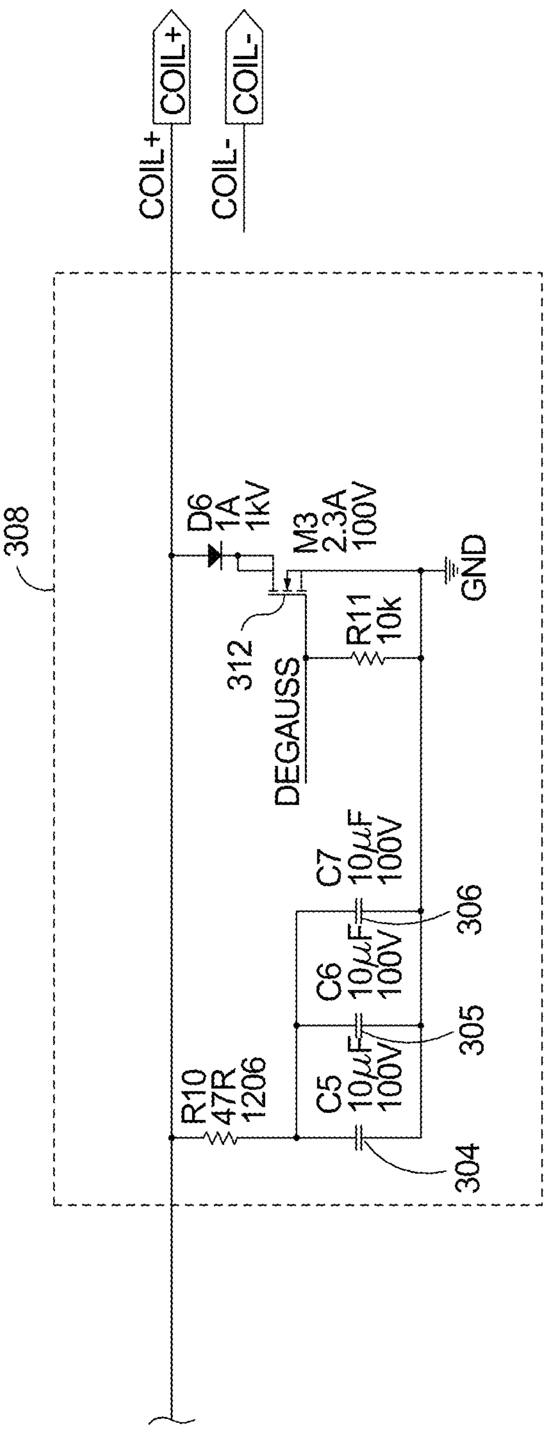

FIG. 3 is a schematic diagram illustrating portions of power control circuit 28 of electromagnetic door lock system 10 in accordance with aspects of the present invention. Referring to FIG. 3, electromagnetic door lock system 10 disclosed herein may include a constant current controller 300 that supplies a constant current to an inductive load (e.g., coil of electromagnet 20). The inductive load comprises an inductance (L) and series resistance (R). Controller 300 may supply a constant current via a switching circuit incorporating a primary switch 330 and a secondary switch 340.

In one embodiment, controller 300 further operates as a pulse width modulation (PWM) controller 300 that causes the periodic current in the inductive load to become constant by implementing a sufficiently high switching frequency. As the frequency increases, the boundary current and the peak current approach the same constant value. The inductive load may comprise a solenoid, a DC motor, or a magnetic actuator. Primary switch 330 may comprise a metal-oxide-semiconductor field-effect-transistor (MOSFET) and secondary switch 340 may comprise a freewheeling diode or MOSFET The inductive load may be used to lock and unlock electromagnet 20, an electromechanical door latch, or electromechanical strike.

In some embodiments, the switching circuit may comprise a current-sensing circuit and PWM controller 300. The current sensing circuit may be a current-sense resistor with an amplifier, a current-sensing integrated circuit, a Hall-effect current sensor, or any other appropriate current sensing circuit known in the art. The current-sensing circuit may feed a voltage proportional to load current to the PWM controller 300, which correspondingly may adjust the duty ratio to achieve the desired load current.

In another exemplary circuit implementation of the constant-current controller, PWM controller 300 may control the frequency and/or the duty ratios of primary switch 330 and secondary switch 340. PWM controller 300 may be a software programmable device such as a microprocessor or a firmware programmable device such as a microcontroller or FPGA. PWM controller 300 may also contain the necessary circuitry to drive primary switch 330 and secondary switch 340. The current-sensing circuit may provide a voltage proportional to load current to PWM controller 300, which may adjust the PWM frequency and/or duty ratio to achieve the desired load current. The current-sensing circuit may be a current-sense resistor, a current-sense amplifier, a Hall-effect sensor, or other suitable current sensing circuit.

The current-sensing circuit may measure the current of the inductive load when primary switch 330 is closed and secondary switch 340 is open. When primary switch 330 is open and secondary switch 340 is closed, current may continue to flow through the inductive load and the current-sensing circuit. The current-sensing circuit may continue to measure the current of the inductive load. PWM controller 300 may generate the appropriate signals to synchronously alternate the on-times and off-times of the primary and secondary switches, respectively.

The electromagnetic lock 18 may operate by passing current though coils that surround a ferrous core generating a magnetic field that permeates the core and creates a magnetic holding force. When the current is removed (e.g., when $V_{MAG}$ goes to 0 volts) the magnetic field collapses, but the core material maintains some residual magnetism that continues to attract the strike plate. This residual magnetism may be neutralized using a degauss circuit, which generates an opposing magnetic field by reversing the direction of the current flowing through the coil.

In a previously utilized approach, degaussing is accomplished using a double pole double throw (DPDT) relay. When the relay is in a normally closed (NC) state, current flows through the windings in one direction and when activated, the current flows through the normally open (NO) contact state. The timing of when to trip the relay and for how long, however, is critical in that if current flows in the opposite direction for too long then a magnetic field will be generated in the opposite direction leaving yet another residual field to neutralize.

In another previously utilized approach, degaussing is achieved by generating an opposing field such that when power from the power supply is removed from the electromagnet, ringing is introduced via a capacitive/resistive circuit. As the ringing dissipates, it has induced the required opposing current to negate the magnetic field. This method, however, requires tuning of the capacitive/resistive circuit in relation to the inductive characteristics of the electromagnet and requires manufacturing tolerances of the armature to be unnecessarily precise to achieve consistent armature release. Otherwise, this previously utilized approach may not operate to reduce the residual magnetism to allow the door to be opened quickly enough.

In contrast, in embodiments of the present invention, when the current is removed (e.g., when $V_{MAG}$ goes to 0 volts), the $V_{MAG}$ SENSE signal indicates to controller 300 to make the duty cycle of the PWM constant, whereby primary switch 330 remains closed and the negative lead of the electromagnetic coil is connected to ground. Additionally, controller 300 may transmit a coil disconnect signal to the base of the bipolar junction transistor Q2 thereby connecting the gate of secondary switch 340 to ground and isolating an active degaussing circuit 308 from input voltage $V_{MAG}$.

When active degaussing circuit 308 is isolated from the input voltage $V_{MAG}$, capacitors 304, 305, 306 discharge thereby initiating a current reversal through the coil of electromagnet 20. While the current flow through the coil is reversed, a degaussing operation is initiated by switching on a transistor 312 in electrical connection with a first lead of the electromagnetic coil to form a short circuit across the electromagnetic coil from the first lead of the electromagnetic coil to the ground.

In the exemplary embodiments of the present invention described above, a key aspect is the use of an active degauss circuit composed of a solid-state device that creates a short circuit across the coil after current reversal is achieved. The short circuit produces a system of variable structure by changing the second-order circuit into two first-order circuits.

Figure 4A:
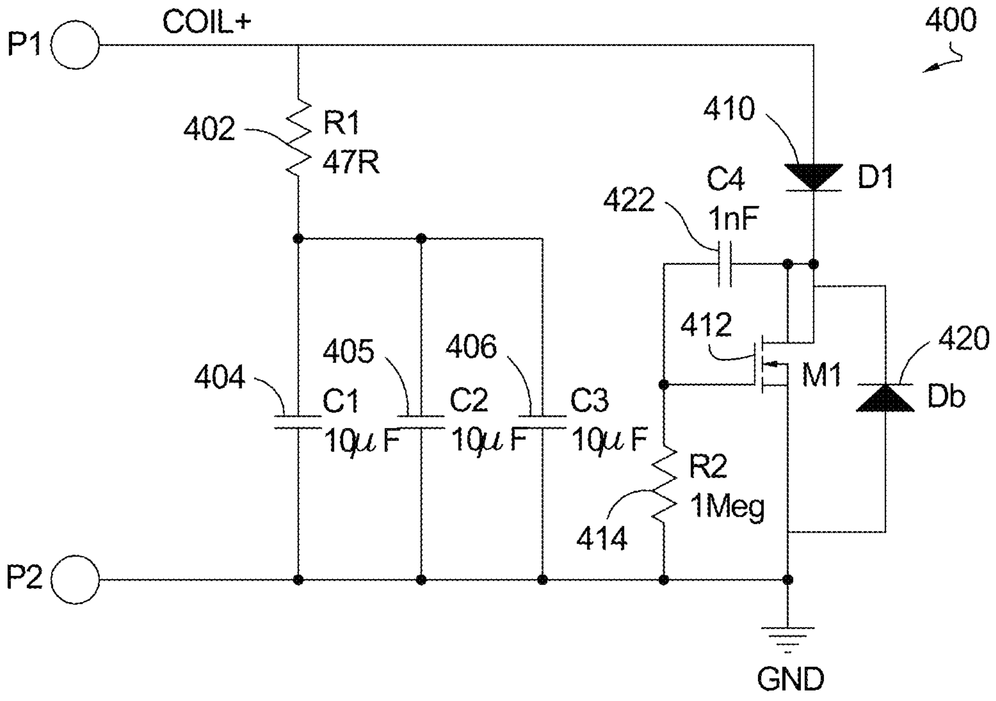
FIG. 4A is a schematic diagram illustrating an exemplary uncontrolled solid-state degauss circuit suitable for use with an electromagnetic lock system in accordance with aspects of the present invention.

FIG. 4A is a schematic diagram illustrating an example uncontrolled solid-state degaussing circuit suitable for use with an electromagnetic door lock system 10 in accordance with aspects of the present invention. Referring to FIG. 4A, an uncontrolled solid-state degaussing circuit 400 may exploit an internal body diode 420 of a metal-oxide semiconductor field-effect transistor (MOSFET) 412 to conduct charge through a capacitor 422 into a gate of the transistor 412 during current reversal.

The uncontrolled solid-state degaussing circuit 400 may comprise at least one resistor 402 in direct electrical connection with a first lead P1 of the electromagnetic coil of electromagnet 20 and at least one first capacitor 404, 405, 406 electrically connected in line with the at least one resistor 402 and in electrical connection with a ground. The uncontrolled solid-state degaussing circuit 400 may further comprise a diode 410 in direct electrical connection with first lead P1 of the electromagnetic coil of electromagnet 20, and transistor 412 is electrically connected in line with the diode 410 and in electrical connection with the ground.

Transistor 412 electrically connected in line with diode 410 may be connected electrically parallel with the at least one resistor 402 in line with the at least one first capacitor 404, 405, 406. Transistor 412 is configured to switch on to form a short circuit from the first lead P1 of the electromagnetic coil to the ground thereby degaussing electromagnet 20. Transistor 412 includes a gate that may be connected to a resistor 414, which is also grounded.

The uncontrolled solid-state degaussing circuit 400 may further include at least one second capacitor 422 electrically connected between the drain of transistor 412 and a gate of the transistor. Internal body diode 420 of the transistor 412 is electrically connected between the source of transistor 412 and the drain of transistor 412. The at least one second capacitor 422 electrically connected to the drain of transistor 412 and the gate of transistor 412 is configured to initiate a degaussing operation on the electromagnetic coil by discharging and switching on transistor 412.

In certain embodiments, the uncontrolled solid-state degaussing circuit 400 may be part of a system for degaussing the electromagnet of an electronically actuated door lock. The system for degaussing the electromagnet of an electronically actuated door lock may comprise the uncontrolled solid-state degaussing circuit 400 and a controller configured to control a current flow through an electromagnetic coil of the electromagnet. The controller may be further configured to provide a pulse width modulation (PWM) to the current flow through the electromagnetic coil, and discontinue the current flow from the power supply through the electromagnetic coil.

In certain embodiments, transistor 412 may be an enhancement-mode N-channel Field-Effect Transistor (FET). The first lead P1 of the electromagnetic coil may be electrically connected to an anode of diode 410, and a cathode of diode 410 may be electrically connected with a drain of transistor 412. A source of transistor 412 may be electrically connected with the ground.

The at least one first capacitor 404, 405, 406 may be configured to discharge when the current flow from a power supply through the electromagnetic coil is discontinued, thereby producing a current reversal through the electromagnetic coil. In certain embodiments, the at least one first capacitor 404, 405, 406 electrically connected in line with the at least one resistor 402 and in electrical connection with the ground may include three capacitors 404, 405, 406 in parallel. Each of the three capacitors 404, 405, 406 may be directly connected in line with the at least one resistor 402 and in electrical connection with the ground.

Figure 4B:
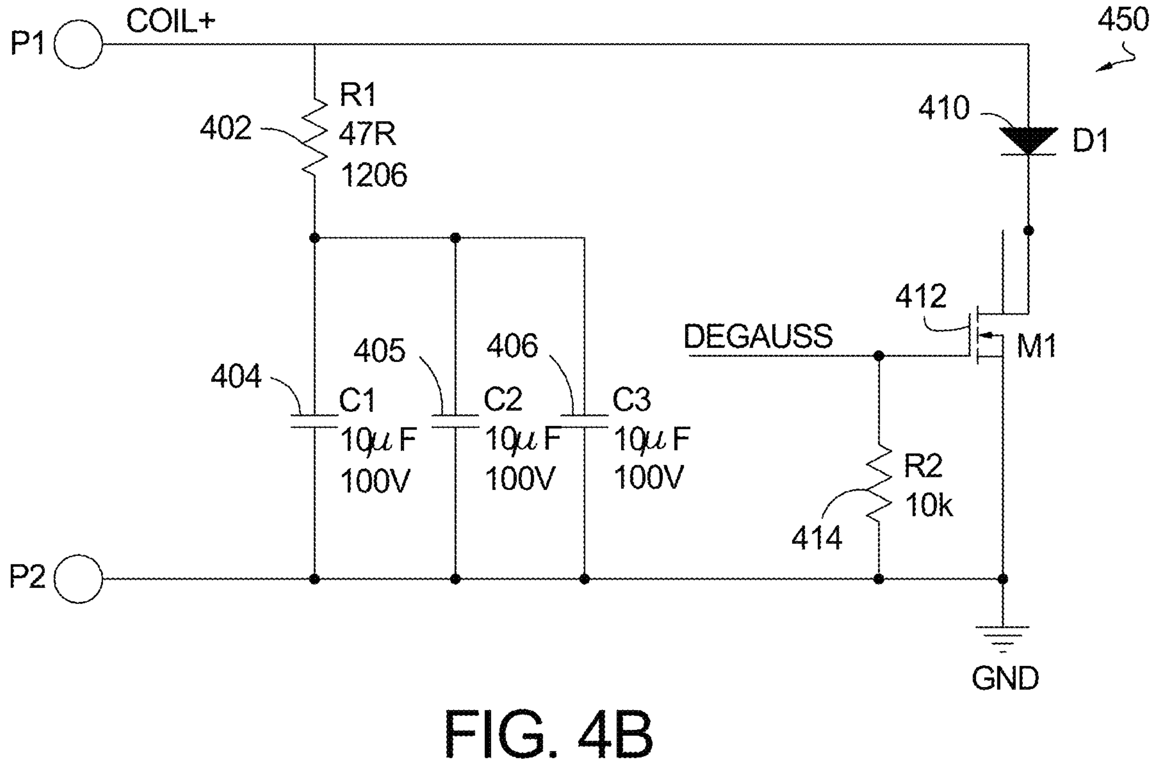
FIG. 4B is a schematic diagram illustrating an exemplary controlled solid-state degauss circuit suitable for use with an electromagnetic lock system in accordance with aspects of the present invention.

FIG. 4B is a schematic diagram illustrating an exemplary controlled solid-state degauss circuit suitable for use with electromagnetic door lock system 10 in accordance with aspects of the present invention. Referring to FIG. 4B, a controlled solid-state degaussing circuit 450 may be configured to receive a degaussing signal from a controller configured to determine if the current from a power supply to the electromagnet has been discontinued. The at least one first capacitor 404, 405, 406 may be configured to discharge when the current flowing from the power supply through the electromagnetic coil is discontinued. Once the reverse current is of sufficient magnitude, the controller may transmit a degauss signal to the gate of transistor 412, which turns transistor 412 on to short circuit the coil.

As can be seen be comparing FIGS. 4A and 4B, the uncontrolled solid-state degaussing circuit 400 may exploit internal body diode 420 of transistor 412 to conduct charge through capacitor 422 into the gate of transistor 412 during current reversal thereby forming a short circuit from the first lead of the electromagnetic coil to the ground thereby degaussing the electromagnet. The controlled solid-state degaussing circuit 450 may be configured to receive a degaussing signal at the gate of transistor 412 from a controller, which turns transistor 412 on to form a short circuit from the first lead of the electromagnetic coil to the ground thereby degaussing the electromagnet. The resulting coil current profile in the uncontrolled case and the controlled case are similar and are illustrated in FIG. 6B.

Figure 5:
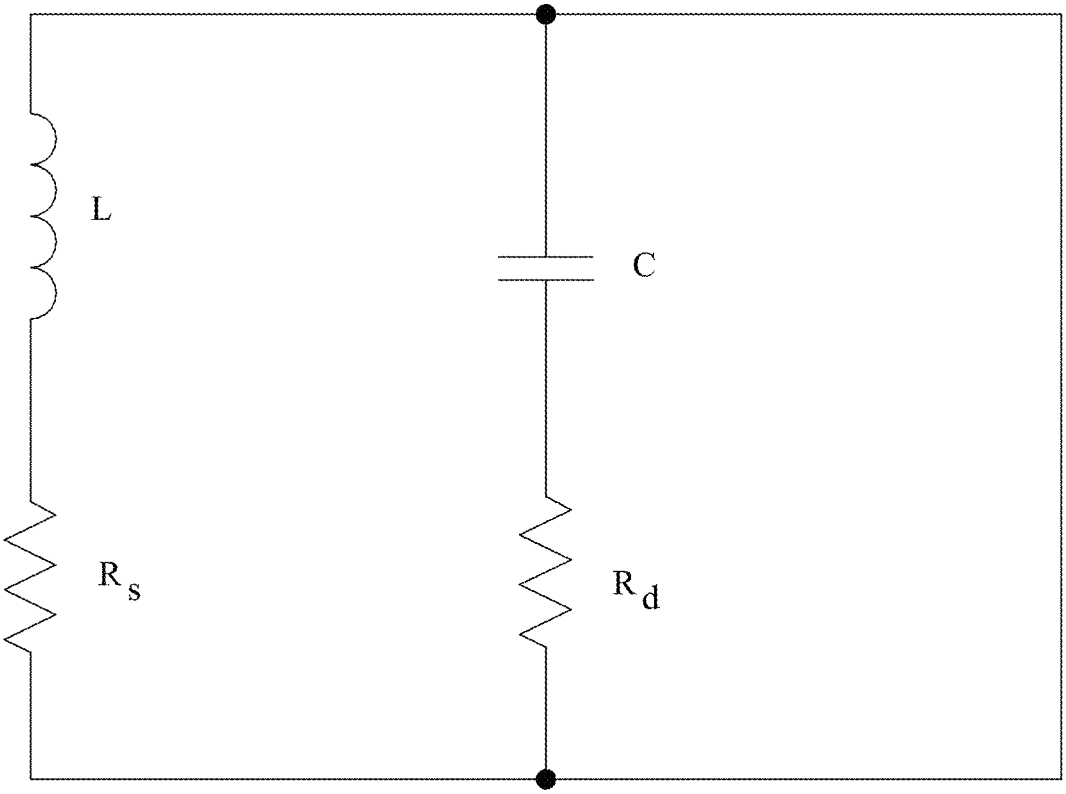
FIG. 5 is a schematic diagram illustrating an equivalent circuit when degaussing the electromagnet coils in accordance with aspects of the present invention.

FIG. 5 is a schematic diagram illustrating an equivalent circuit to the circuits 400, 450 shown in FIGS. 4A and 4B when degaussing the electromagnet coils in accordance with aspects of the present invention. Referring to FIG. 5, inductor L is a coil inductance in the energized, locked state, resistor $R_s$ is a series resistance of the coil, capacitor C is a degaussing capacitance from the at least one capacitor 404, 405, 406, and resistor $R_d$ is a series damping resistance from resistor 402. As with the passive degauss circuit approach, the active, solid-state degauss circuit may require a capacitance to create an under-damped, second-order circuit that results in current reversal. However, the amount of capacitance needed in the active solid-state degauss circuit may be greatly reduced. For example, the active solid-state degauss circuit may benefit from a degauss capacitance of 10-30 micro-Farads (μF), while a passive degauss circuit may benefit from a degauss capacitance of approximately 220 μF.

Figure 6A:
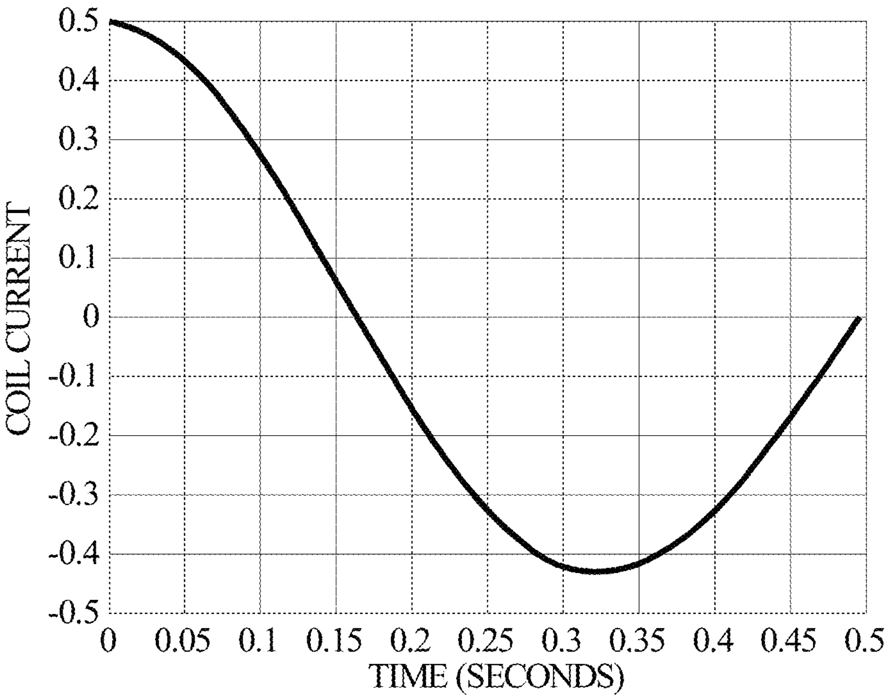
FIG. 6A is a diagram illustrating the coil current resulting from degauss capacitance when power is removed in accordance with passive degauss circuit approach.
Figure 6B:
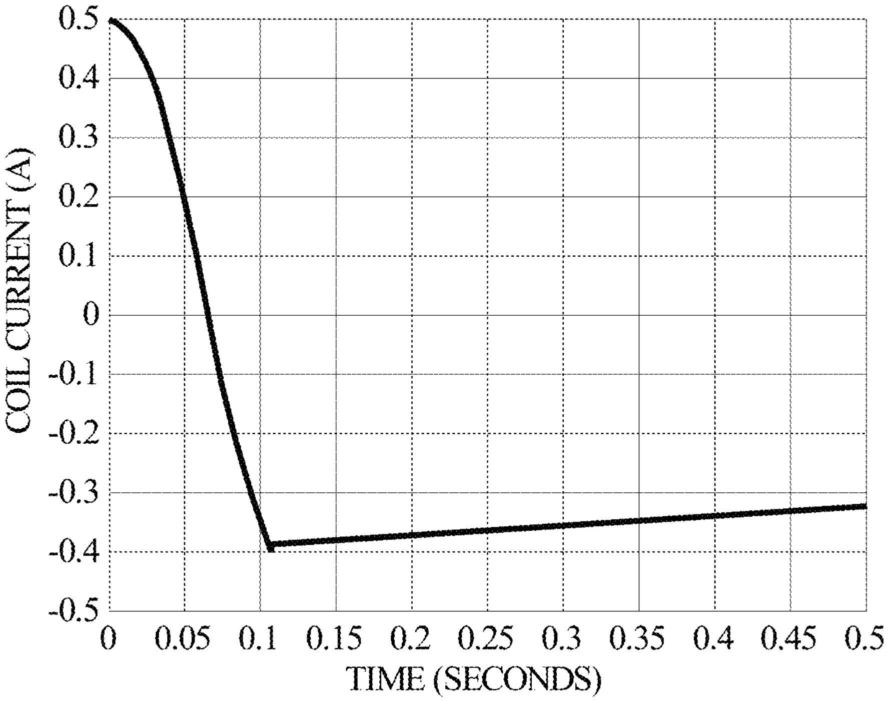
FIG. 6B is a diagram illustrating the coil current resulting from degauss capacitance when power is removed in accordance with a solid-state degauss circuit approach.

FIGS. 6A and 6B are diagrams illustrating the coil current resulting from degauss capacitance when power is removed in accordance with an existing passive degauss circuit approach (FIG. 6A) and in accordance with a solid-state degauss circuit approach (FIG. B). Reverse current coerces the armature in the opposite direction of the locked state. Regulatory standards require that the reverse current must be sustained long enough to release the armature within 0.5 seconds under a force of four pounds or less.

The diagrams shown in FIGS. 6A and 6B illustrate that utilizing a solid-state degauss circuit results in a quicker response time in effecting the reverse current and sustaining the reverse current near a local minimum value for a longer period of time than in the passive degauss circuit. As illustrated, a solid-state degauss circuit approach may result in a reverse current being achieved in less than half the time of a passive degauss circuit (e.g., roughly 0.06 seconds compared to 0.17 seconds). Additionally, armature release typically occurs as the reverse current approaches the local minimum value. Accordingly, a solid-state degauss circuit approach may result in an armature release being achieved in a third of the time of a passive degauss circuit (e.g., less than 0.1 seconds compared to more than 0.3 seconds).

Those skilled in the art will recognize that the boundaries between logic and circuit blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the claims, any reference signs placed between parentheses shall not be construed as limiting the claim. The use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first," "second," etc. are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of degaussing an electromagnet of an electromagnetic door lock, the method comprising:

providing a controller configured to control a current flow through an electromagnetic coil of the electromagnet;

providing at least one resistor in line with at least one first capacitor in electrical connection between a first lead of the electromagnetic coil and a ground;

providing a diode in line with a transistor in electrical connection with the first lead of the electromagnetic coil and the ground and electrically parallel with the at least one resistor in line with the at least one capacitor;

reversing the current flow through the electromagnetic coil; and while reversing the current flow through the electromagnetic coil, performing a degaussing operation on the electromagnet, wherein performing the degaussing operation comprises switching on the transistor in electrical connection with the first lead of the electromagnetic coil to form a short circuit from the first lead of the electromagnetic coil to the ground.

2. The method of degaussing the electromagnet of the electromagnetic door lock of claim 1, wherein the first lead of the electromagnetic coil is electrically connected to an anode of the diode, wherein a cathode of the diode is electrically connected with a drain of the transistor, and wherein a source of the transistor is electrically connected with the ground.

3. The method of degaussing the electromagnet of the electromagnetic door lock of claim 2, further comprising:

transmitting, by the controller, a degaussing control signal to a gate of the transistor to initiate the performing of the degaussing operation on the electromagnetic coil by switching on the transistor.

4. The method of degaussing the electromagnet of the electromagnetic door lock of claim 2, further comprising:

providing at least one second capacitor electrically connected between the drain of the transistor and a gate of the transistor, and providing a body diode of the transistor electrically connected to the source of the transistor and the drain of the transistor.

5. The method of degaussing the electromagnet of the electromagnetic door lock of claim 4, wherein the at least one second capacitor electrically connected to the drain of the transistor and the gate of the transistor initiates the performing of the degaussing operation on the electromagnetic coil by discharging and switching on the transistor.

6. The method of degaussing the electromagnet of the electronically actuated door lock of claim 1, wherein the electromagnet of the electromagnetic door lock comprises the electromagnetic coil and a ferromagnetic core, and wherein the electromagnetic coil is wrapped around the ferromagnetic core, and wherein the degaussing operation comprises degaussing the electromagnetic coil wrapped around the ferromagnetic core.

7. The method of degaussing the electromagnet of the electromagnetic door lock of claim 1, further comprising discharging the at least one first capacitor in response to the reversing of the current flow through the electromagnetic coil, thereby initiating the degaussing operation on the electromagnet.

8. The method of degaussing the electromagnet of the electromagnetic door lock of claim 1, wherein the performing of the degaussing operation on the electromagnet corresponds to a release of an armature by the electromagnet.

9. A system for degaussing an electromagnet of an electromagnetic door lock, the system comprising:

a controller configured to control a current flow through an electromagnetic coil of the electromagnet;

at least one resistor in direct electrical connection with a first lead of the electromagnetic coil of the electromagnet;

at least one first capacitor electrically connected in line with the at least one resistor and in electrical connection with a ground;

a diode in direct electrical connection with the first lead of the electromagnetic coil of the electromagnet; and a transistor electrically connected in line with the diode and in electrical connection with the ground, wherein the transistor electrically connected in line with the diode is connected electrically parallel with the at least one resistor in line with the at least one capacitor wherein the transistor is configured to switch on to form a short circuit from the first lead of the electromagnetic coil to the ground thereby degaussing the electromagnet.

10. The system for degaussing the electromagnet of the electromagnetic door lock of claim 9, wherein the controller is further configured to:

provide a pulse width modulation (PWM) to the current flow through the electromagnetic coil, and reverse the current flow through the electromagnetic coil.

11. The system for degaussing the electromagnet of an electromagnetic door lock of claim 9, wherein the transistor is an enhancement-mode N-channel Field-Effect Transistor (FET).

12. The system for degaussing the electromagnet of an electromagnetic door lock of claim 9, wherein the first lead of the electromagnetic coil is electrically connected to an anode of the diode, wherein a cathode of the diode is electrically connected with a drain of the transistor, and wherein a source of the transistor is electrically connected with the ground.

13. The system for degaussing the electromagnet of the electromagnetic door lock of claim 9, wherein the at least one first capacitor electrically connected in line with the at least one resistor and in electrical connection with the ground comprises three capacitors in parallel, each of the three capacitors being directly connected with the at least one resistor and in electrical connection with the ground.

14. The system for degaussing the electromagnet of the electromagnetic door lock of claim 10, wherein the controller is further configured to:

determine if current flowing to the electromagnet has been reversed, and when the current flowing to the electromagnet has been reversed, transmit a degaussing control signal to a gate of the transistor to initiate a degaussing operation on the electromagnet by switching on the transistor while the current flowing through the electromagnetic coil is reversed.

15. The system for degaussing the electromagnet of the electromagnetic door lock of claim 9, further comprising:

at least one second capacitor electrically connected between the drain of the transistor and a gate of the transistor, and a body diode of the transistor electrically connected to the source of the transistor and the drain of the transistor.

16. The system for degaussing the electromagnet of the electromagnetic door lock of claim 9, wherein the at least one second capacitor electrically connected to the drain of the transistor and the gate of the transistor is configured to initiate a degaussing operation on the electromagnetic coil by discharging and switching on the transistor.

17. The system for degaussing the electromagnet of the electromagnetic door lock of claim 10, wherein the at least one first capacitor is configured to discharge when the current flow through the electromagnetic coil is reversed, thereby producing a current reversal through the electromagnetic coil.

18. The system for degaussing the electromagnet of the electromagnetic door lock of claim 10, wherein the degaussing operation of the electromagnet corresponds to a release of an armature by the electromagnet.

19. A method of degaussing an electromagnetic coil, the method comprising:

providing at least one resistor in line with at least one capacitor in electrical connection with a first lead of the electromagnetic coil and a ground;

providing a diode in line with a transistor in electrical connection with the first lead of the electromagnetic coil and the ground and electrically parallel with the at least one resistor in line with the at least one capacitor; and performing a degaussing operation on the electromagnetic coil by switching on the transistor to form a short circuit from the first lead of the electromagnetic coil to the ground.

* * * * *